United States Patent
Evans, Jr.

[15] 3,696,510
[45] Oct. 10, 1972

[54] MEASURING WHEEL CONSTRUCTION
[72] Inventor: Wallace D. Evans, Jr., Malibu, Calif.
[73] Assignee: Rolatape Corporation, Santa Monica, Calif.
[21] Appl. No.: 111,377

[52] U.S. Cl. .................................. 33/141 R, 235/96
[51] Int. Cl. ............................................. G01c 22/00
[58] Field of Search ....... 235/95, 95 B, 96; 33/141 R, 33/141 E, 141.5

[56] References Cited

UNITED STATES PATENTS

| | | | |
|---|---|---|---|
| 2,312,136 | 2/1943 | Van Triest | 33/141 R |
| 2,557,481 | 6/1951 | Staples et al. | 33/141 R |
| 3,196,545 | 7/1965 | Zell et al. | 33/141 R |
| 3,251,132 | 5/1966 | Hall | 33/141 R |

FOREIGN PATENTS OR APPLICATIONS

| | | | |
|---|---|---|---|
| 1,259,470 | 3/1961 | France | 33/141 R |
| 584,893 | 9/1933 | Germany | 33/141 R |
| 347,643 | 8/1960 | Switzerland | 33/141 R |

*Primary Examiner*—Stephen J. Tomsky
*Assistant Examiner*—Stanley A. Wal
*Attorney*—Robert E. Geauque

[57] ABSTRACT

A measuring wheel construction wherein the rotatable wheel is mounted upon a conical recessed hub, a counter mechanism is secured to the wheel and extends within the recessed hub, the counter mechanism being adapted to record the rotational movement of the wheel, a tubular handle is secured to the counter mechanism by an attaching bracket, the bracket is relieved to not interfere with the surface being measured, the handle being outwardly curved adjacent the bracket.

2 Claims, 4 Drawing Figures

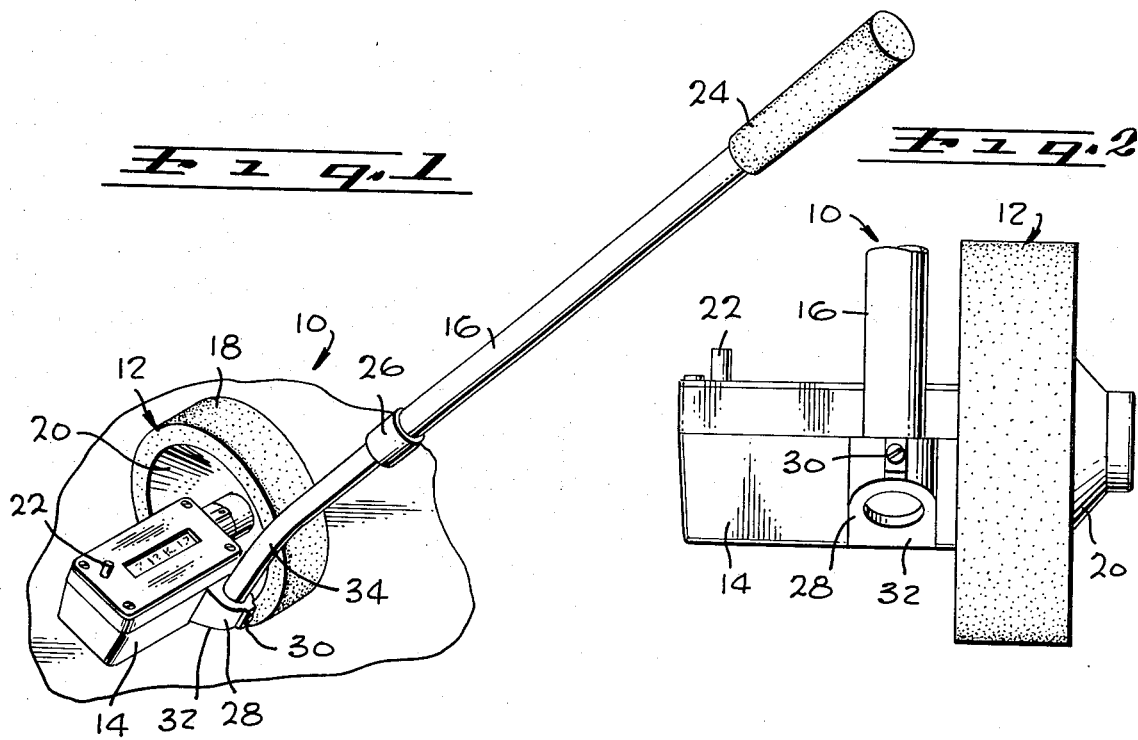
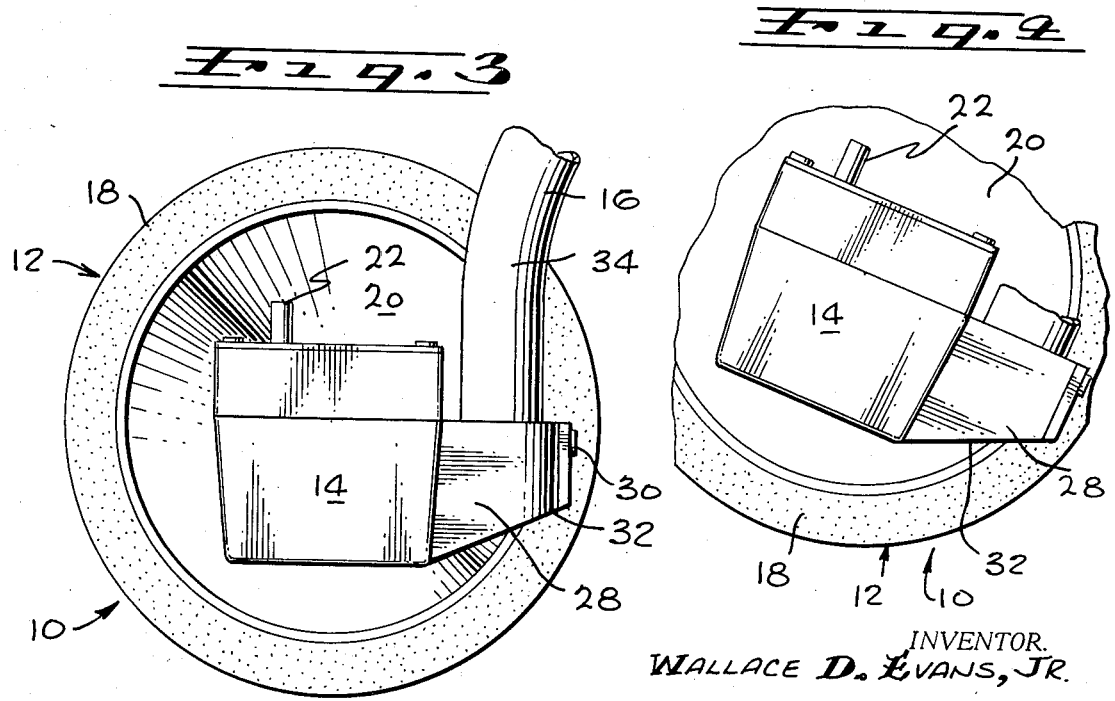

MEASURING WHEEL CONSTRUCTION

BACKGROUND OF THE INVENTION

The field of this invention relates to measuring instruments of the wheel type for taking lineal measurements, and in particular relates to novel and useful improvements in a measuring wheel therefor.

It has been common to employ the use of a measuring wheel to measure ground measurements. Primarily, such measuring wheels have been used in agriculture for the determining of acreage, and by contractors in the laying out of roads and highways.

Although such measuring wheels in the past have been designed for use in the outdoors environment, there has been a definite need for such a measuring wheel to be used indoors by building contractors, real estate appraisers, insurance agents, plus many other indoor uses. Normally, an outdoor measuring wheel is of too large a diameter to make the use of such wheel indoors practical. Therefore, recently a measuring wheel having a relatively small diameter is being employed to effect indoor measurements accurately.

All measuring wheels must employ some type of counter mechanism to measure the rotational movement of the measuring wheel. Normally, the resolution of measurement is in feet and inches. The counter is mounted adjacent the hub of the wheel and extends axially therefrom. The handle of the device, which is to facilitate the movement of the measuring wheel, is normally secured to the counter mechanism thereby permitting complete freedom of movement of the measuring wheel. It has been found to be desirable that the center of gravity of the entire device, in other words, the handle, the counter and the wheel, be substantially in-line with the center line of wheel travel. If the location of the center of gravity is not so established, a natural imbalance occurs which produces a torque during use, tending to move the wheel away from its intended path. Also, such a torque tends to create wheel wobble which causes inaccuracy of measurement.

When the wheel has a large diameter (common in the outdoors type of wheel), such imbalance has little effect. However, in the indoors type of small diameter wheel, the imbalance is more apparent and it therefore makes the use of such a wheel inaccurate.

In the past it has been known to employ a conical shaped hub within a measuring wheel. The counter mechanism is then extended within the recessed portion of the hub, which thereby moves the resultant center of gravity nearer the centerline of the wheel movement. Although the center of gravity has been moved to a more desired location, it has been found to be difficult with a straight handle to facilitate reading of the counter. The handle attaching bracket, which secures the handle to the counter, extends out at a diameter greater than the diameter of the wheel, therefore causing such to come in contact with the surface being measured. Such contact causes the measuring wheel to result in inaccurate measurements.

It would be desirable to design a measuring wheel which is to be used primarily to determine accurate short measurements, such a measuring wheel having a handle configuration which facilitates reading of the counter mechanism, and also a handle attaching bracket of a configuration which would not interfere with the surface to be measured.

SUMMARY OF THE INVENTION

The measuring wheel of this invention is designed to have a relatively small diameter (approximately 4 inches) and has a measuring surface comprising a frictional material (such as neoprene rubber). The hub portion of the wheel is conically shaped with the counter mechanism being secured within the hub portion and extending within the recess of the conical hub. A substantially cylindrical handle is fixedly secured to the counter mechanism by means of an attaching bracket. The handle is curved adjacent the attaching bracket so as to facilitate reading of the counter. The attaching bracket is relieved upon its lowermost surface so as to insure that the attaching bracket will not interfere with the surface to be measured.

BRIEF DESCRIPTION OF THE DRAWING

FIG. 1 is an overall isometric view of the measuring wheel construction of this invention;

FIG. 2 is a fragmentary back view of the measuring wheel of FIG. 1; measuring wheel of FIG. 1; and FIG. 3 is a fragmentary left side view of the measuring wheel of FIG. 1; and FIG. 4 is a view similar to FIG. 3 but showing the counter mechanism angularly displaced from that of FIG. 3 and in the position of normal usage.

DETAILED DESCRIPTION OF THE SHOWN EMBODIMENT

Referring particularly to the drawing, there is shown the measuring wheel apparatus 10 of this invention being composed of the primary elements of a measuring wheel 12, a counter mechanism 14, and a handle 16. The measuring wheel 12 is formed into an outer diameter surface 18 and a hub 20. The surface 18 is to be constructed of a non-metallic frictional material such as neoprene rubber or the like. Such a material facilitates frictional movement of the measuring wheel 12 along the surface to be measured. The hub portion 20 is conically shaped, thereby forming a recess upon one side of the measuring wheel 12.

The counter mechanism 14 is secured to the hub 20 and is adapted to extend within the recessed hub. The counter mechanism 14 forms no specific part of this invention and is conventional. Such counter mechanism are well known and are adapted to count the revolutions of the measuring wheel with respect to a surface. Such counting of revolutions can be in numerous types of incremental measurements such as inches and feet, and feet and tenths of feet. A reset button 22 is provided upon the counter 14 to permit resetting of the counter mechanism 14 back to a zero starting position prior to effecting a measurement.

Handle 16 is composed of a grasping portion 24 and two elements which are telescopingly connected together through a clamp 26. The handle is attached to the counter mechanism 14 by means of an attaching bracket 28. A fastener 30 cooperates with the attaching bracket 28 to fixedly secure the handle 16 within the attaching bracket 28.

It is to be noted that the attaching bracket is secured to the counter mechanism 14 directly adjacent the measuring wheel 12. The reason for this location is that it is desired that the overall center of gravity of the entire apparatus 10 be located as nearly as possible in alignment with the center of the measuring wheel 12. The lower edge of the attaching bracket 28 is relieved at 32 so that no portion of the attaching bracket extends outwardly beyond the diameter of the measuring wheel 12. If such extension was permitted to occur, the attaching bracket 28 may easily interfere with the surface being measured.

Adjacent the attaching bracket 28, the handle 16 is curved at 34 so as to facilitate reading of the counter mechanism 14. The curve 34 is such that the handle 16 angularly deflects away from the counter mechanism 14.

The operation of the apparatus 10 of this invention is as follows:

It would be assumed that the handle 16 is in the compact position. The operator then merely releases the clamp 26 and effects extension of the handle to the desired length and then retightens clamp 26. The operator then actuates the reset button 22 to set the counter mechanism 14 at zero. The operator then proceeds to the starting point and begins moving the surface 18 of the wheel 12 upon the surface to be measured (not shown). It is not necessary for the operator to effect walking as the apparatus 10 of this invention may be employed to measure the height of vertical walls or other similar vertical or substantially vertical structures. Upon the operator reaching the desired end point, the operator then only needs to effect the reading of the counter mechanism 14, thereby denoting an accurate measurement of the desired distance. The measuring wheel apparatus 10 of this invention facilitates measurements outdoors as well as indoors although, because of the small diameter of the measuring wheel 12, the apparatus 10 of this invention is primarily suited for indoor measurement or relatively short distance measurement. The apparatus 10 of this invention measures both flat and curved structures accurately. The measurement can be easily obtained by only a single operator, thereby negating the use of a second operator which is necessary when employing a measuring tape. The apparatus of this invention saves time and labor, and is substantially more convenient than employing the use of a measuring tape.

Numerous modifications could be employed without departing from the scope of this invention. For example, the handle 16 could be formed as an integral unit or formed in three or more parts.

What is claimed is:

1. A measuring wheel apparatus comprising:
   a wheel having a rim portion and a hub portion;
   a counter mechanism rotatably secured to said hub portion and being adapted to record the revolving movement of said wheel;
   a handle attaching bracket secured to said counter mechanism, said handle attaching bracket being relieved on its lower surface to insure non-interference with the surface being measured;
   a handle connected to said handle attaching bracket, the configuration of said handle being such to facilitate reading of said counter mechanism; and
   said hub portion being conically shaped, said counter mechanism extending within the recess of said conically shaped hut.

2. The apparatus of claim 1 wherein:
   said configuration of said handle comprising a curved section adjacent said attaching bracket.

* * * * *